(12) United States Patent
Hu et al.

(10) Patent No.: US 11,146,489 B2
(45) Date of Patent: Oct. 12, 2021

(54) CONGESTION FLOW IDENTIFICATION METHOD AND NETWORK DEVICE

(71) Applicant: HUAWEI TECHNOLOGIES CO., LTD., Guangdong (CN)

(72) Inventors: Nongda Hu, Beijing (CN); Zheng Cao, Shenzhen (CN); Xiaoli Liu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 12 days.

(21) Appl. No.: 16/844,624

(22) Filed: Apr. 9, 2020

(65) Prior Publication Data

US 2020/0236051 A1    Jul. 23, 2020

Related U.S. Application Data

(63) Continuation of application No. PCT/CN2018/106164, filed on Sep. 18, 2018.

(30) Foreign Application Priority Data

Oct. 11, 2017   (CN) .......................... 201710944894.3

(51) Int. Cl.
*H04L 12/801* (2013.01)
*H04L 12/851* (2013.01)
*H04L 12/863* (2013.01)

(52) U.S. Cl.
CPC .......... *H04L 47/11* (2013.01); *H04L 47/2483* (2013.01); *H04L 47/6205* (2013.01)

(58) Field of Classification Search
CPC .............................. H04L 47/11; H04L 47/6205
See application file for complete search history.

(56) References Cited

U.S. PATENT DOCUMENTS

| 6,614,756 | B1 | 9/2003 | Morgenstern et al. |
| 7,145,873 | B2 | 12/2006 | Luijten et al. |

(Continued)

FOREIGN PATENT DOCUMENTS

| CN | 1620040 A | 5/2005 |
| CN | 101582854 A | 11/2009 |

(Continued)

OTHER PUBLICATIONS

Extended European Search Report issued in European Application No. 18866966.7 dated Jul. 31, 2020, 7 pages.

(Continued)

*Primary Examiner* — Siming Liu
(74) *Attorney, Agent, or Firm* — Fish & Richardson P.C.

(57) ABSTRACT

The present disclosure relates to congestion flow identification methods. One example method includes obtaining, by a network device, a queue length of a non-congestion flow queue, where the non-congestion flow queue includes a data packet or description information of the data packet, determining, by the network device, a target output port of a target data packet when the length of the non-congestion flow queue is greater than or equal to a first threshold, where the target data packet is a data packet waiting to enter the non-congestion flow queue or a next data packet waiting to be output from the non-congestion flow queue, and when utilization of the target output port is greater than or equal to a second threshold, determining, by the network device, that a flow corresponding to the target data packet is a congestion flow.

18 Claims, 10 Drawing Sheets

(56) References Cited

U.S. PATENT DOCUMENTS

| | | | |
|---|---|---|---|
| 2003/0035432 | A1 | 2/2003 | Sreejith et al. |
| 2012/0314577 | A1 | 12/2012 | Sun et al. |
| 2014/0237118 | A1 | 8/2014 | Matthews |
| 2019/0068502 | A1* | 2/2019 | Shiraki .................. H04L 47/12 |

FOREIGN PATENT DOCUMENTS

| | | |
|---|---|---|
| CN | 102164067 A | 8/2011 |
| CN | 102223300 A | 10/2011 |
| CN | 103368861 A | 10/2013 |
| CN | 104104617 A | 10/2014 |
| CN | 104852863 A | 8/2015 |
| CN | 104854831 A | 8/2015 |
| CN | 104917703 A | 9/2015 |
| CN | 105187321 A | 12/2015 |

OTHER PUBLICATIONS

PCT International Search Report and Written Opinion issued in International Application No. PCT/CN2018/106164 dated Dec. 20, 2018, 16 pages (with English translation).

Office Action in Chinese Application No. 201710944894.3, dated Mar. 1, 2021, 34 pages.

* cited by examiner

CONGESTION FLOW IDENTIFICATION METHOD AND NETWORK DEVICE

CROSS-REFERENCE TO RELATED APPLICATIONS

This application is a continuation of International Application No. PCT/CN2018/106164, filed on Sep. 18, 2018, which claims priority to Chinese Patent Application No. 201710944894.3, filed on Oct. 11, 2017. The disclosures of the aforementioned applications are hereby incorporated by reference in their entireties.

TECHNICAL FIELD

This application relates to the communications field, and in particular, to a congestion flow identification method and a network device.

BACKGROUND

For a network device (for example, a switch and a router on which there is queued input) with a port on which there is a non-congestion flow queue, when data packets that go to different output ports or different virtual channels of a same output port are in a same non-congestion flow queue, if a data packet at the head of the queue cannot be forwarded due to some reasons (for example, a target output port is busy), even if a subsequent data packet meets a forwarding condition (for example, a target output port is idle), the subsequent data packet cannot be forwarded because first in first out scheduling usually needs to be performed on the data packets in the same queue. In other words, a data packet that can be forwarded is blocked because a previous data packet is paused. This phenomenon is referred to as head of line blocking (HOLB).

Currently, a dynamic congestion isolation technology is usually used to resolve a head of line blocking problem. In the technology, when congestion occurs, a data packet that may cause head of line blocking may be dynamically identified, and the data packet and one or more other data packets that are feature-matched with the data packet are defined as a congestion flow together. Then, the congestion flow is isolated to an independent congestion flow queue, so as to eliminate blocking caused by the congestion flow on another non-congestion flow. The congestion flow is usually identified by using the following method:

For a non-congestion flow queue, a queue length threshold for determining whether congestion occurs is configured. When a queuing length of the queue is greater than or equal to the threshold, a data packet is randomly selected from the queue, or a data packet that is to enter the queue is selected. A flow to which the data packet belongs is identified as the congestion flow.

It can be learned from the foregoing description that, although whether congestion occurs can be determined by using the queue length threshold in this technology, a manner of randomly selecting the data packet and identifying the flow to which the data packet belongs as the congestion flow leads to relatively low congestion flow identification accuracy.

SUMMARY

Embodiments of this application provide a congestion flow identification method and a network device, to improve congestion flow identification accuracy.

In view of this, a first aspect of the embodiments of this application provides a congestion flow identification method, including:

obtaining, by a network device, a queue length of a non-congestion flow queue, where the non-congestion flow queue includes a data packet or description information of the data packet;

determining, by the network device, a target output port of a target data packet when the queue length of the non-congestion flow queue is greater than or equal to a first threshold, where the target data packet is a data packet waiting to enter the non-congestion flow queue or a next data packet waiting to be output from the non-congestion flow queue; and when utilization of the target output port is greater than or equal to a second threshold, determining, by the network device, that a flow corresponding to the target data packet is a congestion flow.

It should be noted that, by querying a correspondence between the target data packet and the target output port in a forwarding information base (forward information base, FIB), the network device may determine the target output port corresponding to the target data packet.

It should be noted that, after determining the congestion flow, the network device isolates the congestion flow to a congestion flow queue.

The network device may obtain the length of the non-congestion flow queue. Subsequently, when the length of the non-congestion flow queue is greater than or equal to the first threshold, the network device determines the target output port corresponding to the target data packet. Then, when the utilization of the target output port is greater than or equal to the second threshold, the network device determines that the flow corresponding to the target data packet is the congestion flow. In the method, the utilization of the target output port is monitored. When the utilization of the target output port is greater than or equal to the second threshold, it indicates that the target output port outputs a relatively large quantity of data packets, and blocking may be caused. Then, a flow that needs to be output from the target output port is highly probably a congestion flow. Therefore, congestion flow identification accuracy is improved in the method.

With reference to the first aspect of the embodiments of this application, in a first implementation of the first aspect of the embodiments of this application, the method further includes:

when the utilization of the target output port is less than the second threshold, determining, by the network device, whether the target output port is flow-controlled and suspended from performing sending; and if the target output port is flow-controlled and suspended from performing sending, determining, by the network device, that the flow corresponding to the target data packet is the congestion flow.

The embodiments of this application provide a method for further determining a congestion flow when the utilization of the target output port is less than the second threshold. Implementations of the embodiments of this application are expanded.

With reference to the first aspect of the embodiments of this application or the first implementation of the first aspect, in a second embodiment of the first aspect of the embodiments of this application, after the determining, by the network device, that a flow corresponding to the target data packet is a congestion flow, the method further includes:

recording, by the network device, target representation information of the target data packet in a congestion flow table.

It should be noted that the target representation information may be 1-tuple information of the target data packet, for example, a destination Internet Protocol (Internet Protocol, IP) address of the target data packet, may be multi-tuple information of the target data packet, for example, 5-tuple information of the target data packet, or may be information in a form of a 1-tuple or multi-tuple and a mask of the target data packet, for example, information in a form of a destination IP address and a mask of the target data packet. This is not specifically limited herein.

It may be understood that a flow is a set of data packets having same representation information, and therefore, the target representation information is representation information of the congestion flow to which the target data packet belongs.

It should be noted that each input port in the network device is corresponding to a congestion flow table. In addition, a plurality of different input ports in the network device may share a same congestion flow table. This is not specifically limited herein.

With reference to the second implementation of the first aspect of the embodiments of this application, in a third implementation of the first aspect of the embodiments of this application, the method further includes:

performing, by the network device, enqueue control based on the congestion flow table.

It should be noted that, before a data packet enters a queue, the network device may allocate, to the queue by searching and comparing the congestion flow table, the data packet that has not entered the queue.

With reference to the third implementation of the first aspect of the embodiments of this application, in a fourth implementation of the first aspect of the embodiments of this application, the performing, by the network device, enqueue control based on the congestion flow table includes:

extracting, by the network device, first representation information of a first data packet, where the first data packet is a data packet that is after the target data packet and that waits to enter the non-congestion flow queue;

determining, by the network device, whether the first representation information matches the congestion flow table; and allocating, by the network device, the first data packet to a congestion flow queue if the first representation information matches the congestion flow table, where the congestion flow queue includes the congestion flow.

It may be understood that the network device searches the congestion flow table, and determines whether recorded representation information of a congestion flow in the congestion flow table matches the first representation information.

It should be noted that, when the first indication information does not match the congestion flow table, the network device may have two execution manners. In a first manner, the network device allocates the first data packet to the non-congestion flow queue. In this case, the network device does not perform congestion flow identification on the first data packet before the first data packet enters the queue. In a second manner, the network device performs a step of congestion flow identification on the first data packet. The network device determines whether the queue length of the non-congestion flow queue corresponding to the first data packet is greater than or equal to the first threshold. If the queue length of the non-congestion flow queue corresponding to the first data packet is greater than or equal to the first threshold, the network device determines whether utilization of a first output port corresponding to the first data packet is greater than or equal to the second threshold. If the utilization of the first output port corresponding to the first data packet is greater than or equal to the second threshold, the network device determines that a flow corresponding to the first data packet is a congestion flow, and then records the first representation information of the first data packet in the congestion flow table.

With reference to the first aspect of the embodiments of this application or the first implementation of the first aspect, in a fifth implementation of the first aspect of the embodiments of this application, the method further includes:

performing, by the network device, dequeue scheduling according to a preset scheduling policy.

It should be noted that, the network device may first determine, according to the preset scheduling policy, a second data packet that needs to be scheduled for dequeuing. Then, the network device determines whether the second data packet belongs to a congestion flow queue. If the second data packet belongs to the congestion flow queue, the network device schedules the second data packet for dequeuing. If the second data packet does not belong to the congestion flow queue, it indicates that the second data packet is from the non-congestion flow queue, and the network device performs a step of congestion flow identification on the second data packet. The network device determines whether the queue length of the non-congestion flow queue corresponding to the second data packet is greater than or equal to the first threshold. If the queue length of the non-congestion flow queue corresponding to the second data packet is greater than or equal to the first threshold, the network device determines whether utilization of a second output port corresponding to the second data packet is greater than or equal to the second threshold. If the utilization of the second output port corresponding to the second data packet is greater than or equal to the second threshold, the network device determines that a flow corresponding to the second data packet is a congestion flow, and then records second representation information of the second data packet in the congestion flow table.

A second aspect of the embodiments of this application provides a congestion flow identification method, including:

obtaining, by a network device, a length of a non-congestion flow queue, where the non-congestion flow queue includes a data packet or description information of the data packet;

determining, by the network device, a target output port of a target data packet when the queue length of the non-congestion flow queue is greater than or equal to a first threshold, where the target data packet is a data packet waiting to enter the non-congestion flow queue or a next data packet waiting to be output from the non-congestion flow queue; and when the target output port is flow-controlled and is suspended from performing sending, determining, by the network device, that a flow corresponding to the target data packet is a congestion flow.

It should be noted that, by querying a correspondence between the target data packet and the target output port in a FIB, the network device may determine the target output port corresponding to the target data packet.

It should be noted that, after determining the congestion flow, the network device isolates the congestion flow to a congestion flow queue.

The network device may obtain the length of the non-congestion flow queue. Subsequently, when the length of the non-congestion flow queue is greater than or equal to the first threshold, the network device determines the target output port corresponding to the target data packet. Then, when the target output port is flow-controlled and is suspended from performing sending, the network device determines that the flow corresponding to the target data packet is the congestion flow. When the target output port is flow-controlled, it indicates that the target output port cannot normally forward a data packet currently. Then, a flow that needs to be output from the target output port is highly probably a congestion flow. Therefore, congestion flow identification accuracy is improved in the method.

With reference to the second aspect of the embodiments of this application, in a first implementation of the second aspect of the embodiments of this application, the method further includes:

when the target output port is not flow-controlled and can continue to perform sending, determining, by the network device, whether utilization of the target output port is greater than or equal to a second threshold; and if the utilization of the target output port is greater than or equal to the second threshold, determining, by the network device, that the flow corresponding to the target data packet is the congestion flow.

The embodiments of this application provide a method for further determining a congestion flow when the target output port is not flow-controlled. Implementations of the embodiments of this application are expanded.

With reference to the second aspect of the embodiments of this application or the first implementation of the second aspect, in a second implementation of the second aspect of the embodiments of this application, after the determining, by the network device, that a flow corresponding to the target data packet is a congestion flow, the method further includes:

recording, by the network device, target representation information of the target data packet in a congestion flow table.

It should be noted that the target representation information may be 1-tuple information of the target data packet, for example, a destination IP address of the target data packet, may be multi-tuple information of the target data packet, for example, 5-tuple information of the target data packet, or may be information in a form of a 1-tuple or multi-tuple and a mask of the target data packet, for example, information in a form of a destination IP address and a mask of the target data packet. This is not specifically limited herein.

It should be noted that each input port in the network device is corresponding to a congestion flow table. In addition, a plurality of different input ports in the network device may share a same congestion flow table. This is not specifically limited herein.

With reference to the second implementation of the second aspect of the embodiments of this application, in a third implementation of the second aspect of the embodiments of this application, the method further includes:

performing, by the network device, enqueue control based on the congestion flow table.

It should be noted that, before a data packet enters a queue, the network device may allocate, to the queue by searching and comparing the congestion flow table, the data packet that has not entered the queue.

With reference to the third implementation of the second aspect of the embodiments of this application, in a fourth implementation of the second aspect of the embodiments of this application, the performing, by the network device, enqueue control based on the congestion flow table includes:

extracting, by the network device, first representation information of a first data packet, where the first data packet is a data packet that is after the target data packet and that waits to enter the non-congestion flow queue;

determining, by the network device, whether the first representation information matches the congestion flow table; and allocating, by the network device, the first data packet to a congestion flow queue if the first representation information matches the congestion flow table, where the congestion flow queue includes the congestion flow.

It should be noted that, when the first indication information does not match the congestion flow table, the network device may have two execution manners. In a first manner, the network device allocates the first data packet to the non-congestion flow queue. In this case, the network device does not perform congestion flow identification on the first data packet before the first data packet enters the queue. In a second manner, the network device performs a step of congestion flow identification on the first data packet. The network device determines whether the queue length of the non-congestion flow queue corresponding to the first data packet is greater than or equal to the first threshold. If the queue length of the non-congestion flow queue corresponding to the first data packet is greater than or equal to the first threshold, the network device determines whether a first output port corresponding to the first data packet is flow-controlled and is suspended from performing sending. If the first output port corresponding to the first data packet is flow-controlled and is suspended from performing sending, the network device determines that a flow corresponding to the first data packet is a congestion flow, and then records the first representation information of the first data packet in the congestion flow table.

With reference to the second aspect of the embodiments of this application or the first implementation of the second aspect, in a fifth implementation of the second aspect of the embodiments of this application, the method further includes:

performing, by the network device, dequeue scheduling according to a preset scheduling policy.

It should be noted that, the network device may first determine, according to the preset scheduling policy, a second data packet that needs to be scheduled for dequeuing. Then, the network device determines whether the second data packet belongs to a congestion flow queue. If the second data packet belongs to the congestion flow queue, the network device schedules the second data packet for dequeuing. If the second data packet does not belong to the congestion flow queue, it indicates that the second data packet is from the non-congestion flow queue, and the network device performs a step of congestion flow identification on the second data packet. The network device determines whether the queue length of the non-congestion flow queue corresponding to the second data packet is greater than or equal to the first threshold. If the queue length of the non-congestion flow queue corresponding to the second data packet is greater than or equal to the first threshold, the network device determines whether a second output port corresponding to the second data packet is flow-controlled and is suspended from performing sending. If the second output port corresponding to the second data packet is flow-controlled and is suspended from performing sending, the network device determines that a flow corresponding to the second data packet is a congestion flow, and then records second representation information of the second data packet in the congestion flow table.

A third aspect of the embodiments of this application provides a network device, including:

an obtaining unit, configured to obtain a queue length of a non-congestion flow queue, where the non-congestion flow queue includes a data packet or description information of the data packet;

a determining unit, configured to determine a target output port of a target data packet when the queue length of the non-congestion flow queue is greater than or equal to a first threshold, where the target data packet is a data packet waiting to enter the non-congestion flow queue or a next data packet waiting to be output from the non-congestion flow queue;

a judgment unit, configured to: determine whether utilization of the target output port is greater than or equal to a second threshold; or determine whether the target output port is flow-controlled and is suspended from performing sending; and an identification unit, configured to: when the utilization of the target output port is greater than or equal to the second threshold, or when the target output port is flow-controlled and is suspended from performing sending, determine that a flow corresponding to the target data packet is a congestion flow.

With reference to the third aspect of the embodiments of this application, in a first implementation of the third aspect of the embodiments of this application, the network device further includes:

a record unit, configured to record target representation information of the target data packet in a congestion flow table.

With reference to the first implementation of the third aspect of the embodiments of this application, in a second implementation of the third aspect of the embodiments of this application, the network device further includes:

a control unit, configured to perform enqueue control based on the congestion flow table.

With reference to the second implementation of the third aspect of the embodiments of this application, in a third implementation of the third aspect of the embodiments of this application, the control unit includes:

an extraction subunit, configured to extract first representation information of a first data packet, where the first data packet is a data packet that is after the target data packet and that waits to enter the non-congestion flow queue;

a judgment subunit, configured to determine whether the first representation information matches the congestion flow table; and an allocation subunit, configured to allocate the first data packet to a congestion flow queue when the first representation information matches the congestion flow table, where the congestion flow queue includes the congestion flow.

With reference to the third aspect of the embodiments of this application, in a fourth implementation of the third aspect of the embodiments of this application, the network device further includes:

a scheduling unit, configured to perform dequeue scheduling according to a preset scheduling policy.

A fourth aspect of the embodiments of this application provides a network device, including:

a processor, a memory, a bus, and an input/output interface, where the memory stores program code; and when invoking the program code in the memory, the processor performs the following operations:

obtaining a queue length of a non-congestion flow queue, where the non-congestion flow queue includes a data packet or description information of the data packet;

determining a target output port of a target data packet when the queue length of the non-congestion flow queue is greater than or equal to a first threshold, where the target data packet is a data packet waiting to enter the non-congestion flow queue or a next data packet waiting to be output from the non-congestion flow queue; and when the target output port is flow-controlled and is suspended from performing sending, determining that a flow corresponding to the target data packet is a congestion flow.

A fifth aspect of the embodiments of this application provides a network device, including:

a processor, a memory, a bus, and an input/output interface, where the memory stores program code; and when invoking the program code in the memory, the processor performs the following operations:

obtaining a length of a non-congestion flow queue, where the non-congestion flow queue includes a data packet or description information of the data packet;

determining a target output port of a target data packet when the queue length of the non-congestion flow queue is greater than or equal to a first threshold, where the target data packet is a data packet waiting to enter the non-congestion flow queue or a next data packet waiting to be output from the non-congestion flow queue; and when the target output port is flow-controlled and is suspended from performing sending, determining that a flow corresponding to the target data packet is a congestion flow.

A sixth aspect of the embodiments of this application provides a computer readable storage medium. The computer readable storage medium stores an instruction, and when the instruction runs on a computer, the computer performs a procedure in the congestion flow identification method according to the first aspect or the second aspect.

A seventh aspect of the embodiments of this application provides a computer program product. When the computer program product runs on a computer, the computer performs a procedure in the congestion flow identification method according to the first aspect or the second aspect.

It can be learned from the foregoing technical solutions that the embodiments of this application have the following advantages:

In the embodiments, the network device may obtain the length of the non-congestion flow queue. Subsequently, when the length of the non-congestion flow queue is greater than or equal to the first threshold, the network device determines the target output port corresponding to the target data packet. Then, when the utilization of the target output port is greater than or equal to the second threshold, the network device determines that the flow corresponding to the target data packet is the congestion flow. In the method, the utilization of the target output port is monitored. When the utilization of the target output port is greater than or equal to the second threshold, it indicates that the target output port outputs a relatively large quantity of data packets, and blocking may be caused. Then, a flow that needs to be output from the target output port is highly probably a congestion flow. Therefore, congestion flow identification accuracy is improved in the method.

DESCRIPTION OF EMBODIMENTS

Embodiments of this application provide a congestion flow identification method and a network device, to improve congestion flow identification accuracy.

Figure 1:
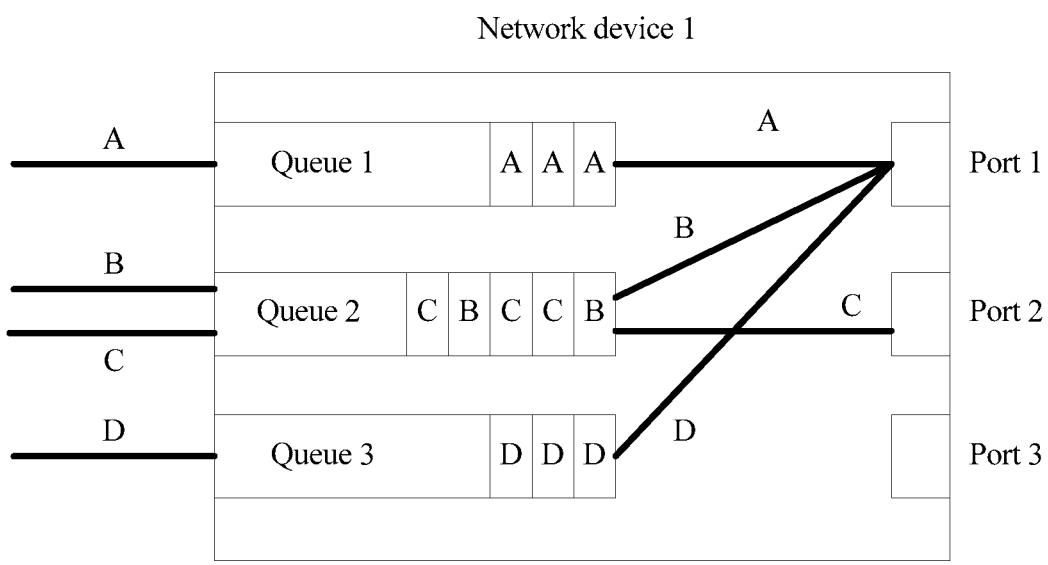
FIG. 1 is a schematic diagram of head of line blocking of a network device.

The embodiments may be applied to a network device in a switching network such as a local area network or a wide area network. FIG. 1 shows a scenario of head of line blocking in the network device. A, B, C, and D are four different flows. The flow may be understood as a set of data packets that have same representation information. Each flow is corresponding to an output port. For example, the flow A, the flow B, and the flow D in the figure are corresponding to an output port 1, and the flow C is corresponding to an output port 2. The flow A is located in a queue 1. The flow B and the flow C are located in a queue 2. The flow D is located in a queue 3. In this case, the flow A, the flow B, and the flow D contend for the output port 1. At a same moment, when a data packet in one of the flows is forwarded to the output port 1, a data packet in the other flows needs to wait in the queue. Therefore, at a specific moment, data packets that belong to the flow A, the flow B, and the flow D in the queue 1, the queue 2, and the queue 3 may need to wait and cannot be normally forwarded. The output port 2 corresponding to the flow C is relatively idle and should normally perform forwarding. However, in this case, because a data packet in the head-of-line flow B in the queue 2 cannot be normally forwarded, forwarding of a data packet in the flow C in the queue 2 is blocked. This may cause congestion in the queue 2.

Figure 2:
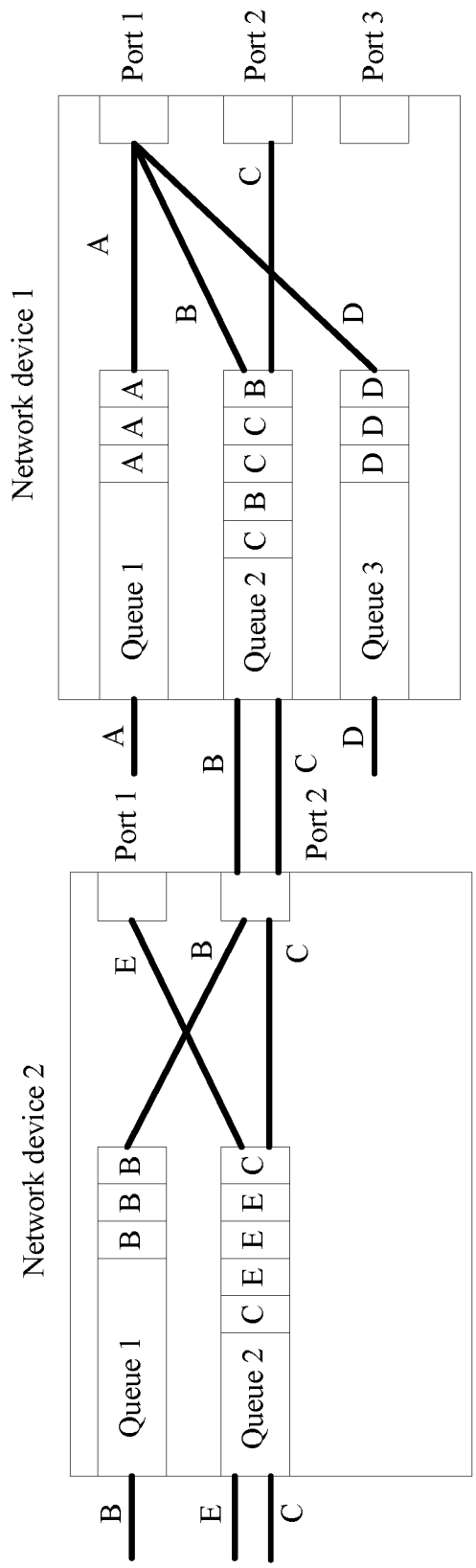
FIG. 2 is a schematic diagram of a flow-controlled network device.

In addition, head of line blocking is more apparent in a network under link-level flow control. As shown in FIG. 2, congestion occurs in a queue 2 in a network device 1, and a flow C cannot be normally forwarded. In this case, the network device 1 sends flow control to a network device 2, to restrain the network device 2 from sending a data packet to the network device 1. In other words, an output port 2 of the network device 2 is flow-controlled and cannot send a data packet. In this case, a data packet that belongs to the flow C in a queue 2 in the network device 2 and that is to be sent to the output port 2 of the device needs to wait in the queue and cannot be normally forwarded. Because the flow C in the queue 2 in the network device 2 blocks a flow E, the flow E cannot be normally forwarded either. This may further cause congestion in the queue 2 in the network device 2. It can be learned that, in the network under link-level flow control, when congestion occurs in a downstream device, the downstream device sends flow control to an upstream device. This may further cause congestion in the upstream device, resulting in a chain reaction, namely, congestion diffusion.

It may be understood that a necessary manner for resolving queue congestion is to identify a congestion flow causing queue congestion and isolate the congestion flow from a queue.

For ease of understanding, the following describes a specific procedure in the embodiments of this application. The embodiments of this application may be divided into two solutions.

Solution 1: When a queue length of a non-congestion flow queue in a network device is greater than or equal to a first threshold, the network device determines whether utilization of a target output port corresponding to a target data packet is greater than or equal to a first threshold, and if the utilization of the target output port corresponding to the target data packet is greater than or equal to the first threshold, the network device determines that a flow corresponding to the target data packet is a congestion flow.

Figure 3:
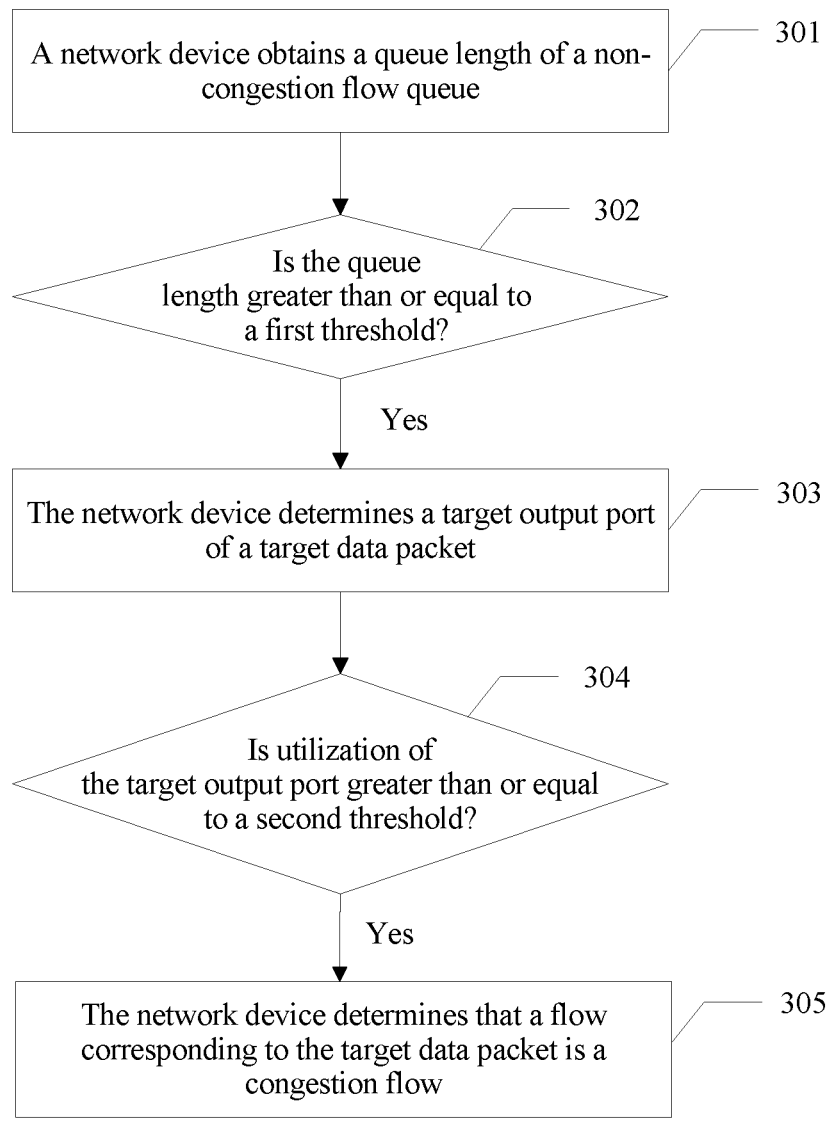
FIG. 3 is a schematic diagram of an embodiment of a congestion flow identification method according to this application.

Referring to FIG. 3, an embodiment of a congestion flow identification method in the embodiments of this application includes the following steps.

301. A network device obtains a queue length of a non-congestion flow queue.

In this embodiment, the network device obtains the queue length of the non-congestion flow queue. It may be understood that the network device may be a switch, or the network device may be another device such as a router. This is not specifically limited herein.

It should be noted that the non-congestion flow queue may include a data packet, or the non-congestion flow queue may include description information of the data packet. This is not specifically limited herein. It may be understood that the network device may determine, by using the description information, an output port corresponding to the data packet.

It should be noted that a set of data packets in the non-congestion flow queue that have same representation information may be defined as a flow.

It may be understood that the flow may be a set of data packets having a same 1-tuple, for example, a set of data packets having a same destination IP address. Alternatively, the flow may be a set of data packets having a same multi-tuple, for example, a set of data packets having a same 5-tuple, or the flow may be a set of data packets having a same 1-tuple or multi-tuple and a same mask, for example, a set of data packets having a same destination IP address and a same mask. This is not specifically limited herein.

302. The network device determines whether the queue length is greater than or equal to a first threshold, and performs step 303 if the queue length is greater than or equal to the first threshold.

In this embodiment, after obtaining the queue length of the non-congestion flow queue, the network device determines whether the queue length is greater than or equal to the first threshold.

303. The network device determines a target output port of a target data packet.

When the queue length of the non-congestion flow queue is greater than or equal to the first threshold, it indicates that congestion occurs in the output queue, and then the network device determines the target output port corresponding to the target data packet.

It should be noted that the target data packet may be a data packet waiting to enter the non-congestion flow queue. Alternatively, the target data packet may be another data packet. For example, the target data packet may be a data packet waiting to be output from the non-congestion flow queue. This is not specifically limited herein.

It should be noted that each data packet in the network device is corresponding to an output port. The network device may determine, by searching a FIB, an output port corresponding to a data packet. It may be understood that the network device may determine an output port of a data packet by searching the FIB when the data packet enters the non-congestion flow queue. Alternatively, the network device may determine an output port of a data packet by searching the FIB when the data packet is output from the non-congestion flow queue. This is not specifically limited herein.

304. The network device determines whether utilization of the target output port is greater than or equal to a second threshold, and performs step 305 if the utilization of the target output port is greater than or equal to the second threshold.

In this embodiment, after determining the target output port, the network device determines whether the utilization of the target output port is greater than or equal to the second threshold.

It should be noted that, port utilization=port sending rate/port bandwidth. It may be understood that the port sending rate may be a current sending rate of the port. Alternatively, the port sending rate may be an average sending rate of the port in specific duration. This is not specifically limited herein.

305. The network device determines that a flow corresponding to the target data packet is a congestion flow.

When the utilization of the target output port is greater than or equal to the second threshold, it indicates that the target output port forwards a relatively large quantity of data packets, and a forwarding pause may occur. In this case, the network device may determine that the flow corresponding to the target data packet that needs to be output from the target output port is the congestion flow.

In this embodiment, the network device may obtain the length of the non-congestion flow queue. Subsequently, when the length of the non-congestion flow queue is greater than or equal to the first threshold, the network device determines the target output port corresponding to the target data packet. Then, when the utilization of the target output port is greater than or equal to the second threshold, the network device determines that the flow corresponding to the target data packet is the congestion flow. In the method, the utilization of the target output port is monitored. When the utilization of the target output port is greater than or equal to the second threshold, it indicates that the target output port outputs a relatively large quantity of data packets, and blocking may be caused. Then, a flow that needs to be output from the target output port is highly probably a congestion flow. Therefore, congestion flow identification accuracy is improved in the method.

Solution 2: When a queue length of a non-congestion flow queue in a network device is greater than or equal to a first threshold, the network device determines whether a target output port corresponding to a target data packet is flow-controlled, and if the target output port corresponding to the target data packet is flow-controlled, the network device determines that a flow corresponding to the target data packet is a congestion flow.

Figure 4:
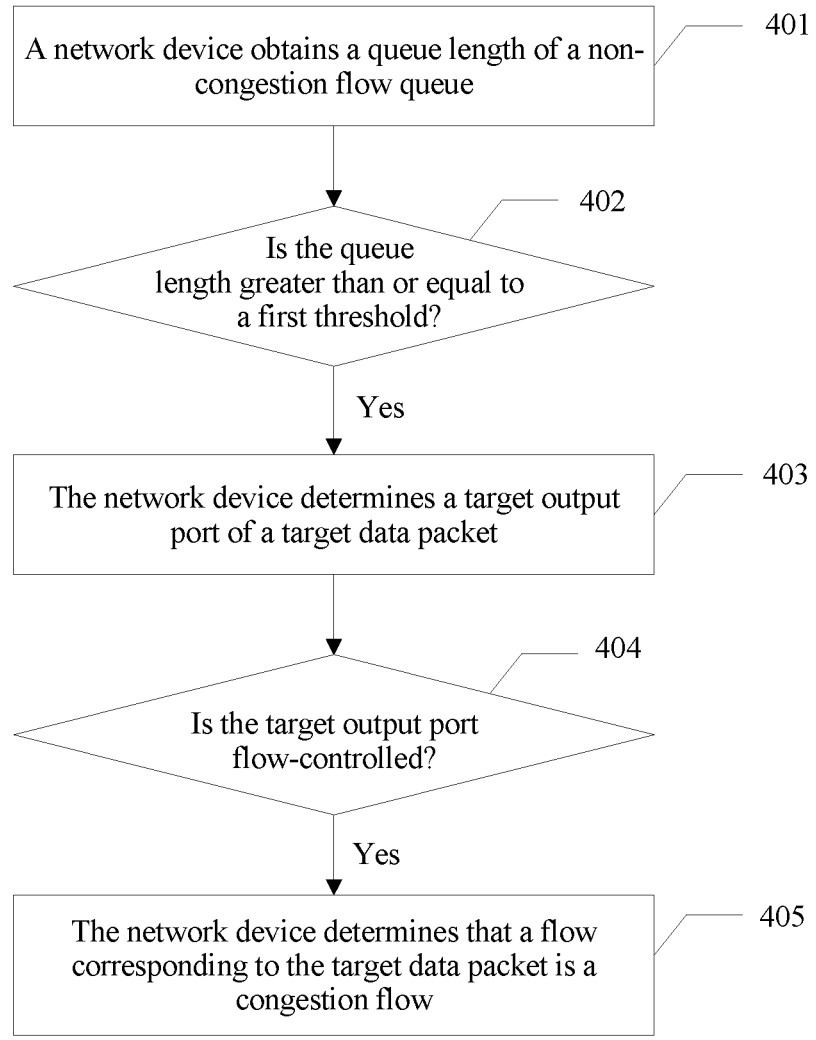
FIG. 4 is a schematic diagram of another embodiment of a congestion flow identification method according to this application.

Referring to FIG. 4, another embodiment of a congestion flow identification method in an embodiment of this application includes the following steps.

401. A network device obtains a queue length of a non-congestion flow queue.

In this embodiment, step 401 is similar to step 301 in the embodiment shown in FIG. 3, and details are not described herein again.

402. The network device determines whether the queue length is greater than or equal to a first threshold, and performs step 303 if the queue length is greater than or equal to the first threshold.

In this embodiment, step 402 is similar to step 302 in the embodiment shown in FIG. 3, and details are not described herein again.

403. The network device determines a target output port of a target data packet.

In this embodiment, step 403 is similar to step 303 in the embodiment shown in FIG. 3, and details are not described herein again.

404. The network device determines whether the target output port is flow-controlled, and performs step 405 if the target output port is flow-controlled.

In this embodiment, after determining the target output port, the network device determines whether the target output port is flow-controlled. It may be understood that a flow-controlled output port in the network device cannot normally forward a data packet.

It should be noted that whether the target output port is flow-controlled is determined only when a network in which the network device is located supports flow control and a flow control function is enabled. If the network does not support flow control or the flow control function is not enabled, it may be considered that all output ports of the network device are in a non-flow-controlled state.

405. The network device determines that a flow corresponding to the target data packet is a congestion flow.

When the target output port is flow-controlled, it indicates that the target output port is restrained and cannot normally forward a data packet. In this case, the network device may determine that the flow corresponding to the target data packet that needs to be output from the target output port is the congestion flow.

In this embodiment, the network device may obtain the length of the non-congestion flow queue. Subsequently, when the length of the non-congestion flow queue is greater than or equal to the first threshold, the network device determines the target output port corresponding to the target data packet. Then, when the target output port is flow-controlled, the network device determines that the flow corresponding to the target data packet is the congestion flow. In the method, whether the target output port is flow-controlled is monitored. When the target output port is flow-controlled, it indicates that the target output port cannot normally forward a data packet. Then, a flow that needs to be output from the target output port is highly probably a congestion flow. Therefore, congestion flow identification accuracy is improved in the method.

In actual application, there are a plurality of occasions for a network device to identify a congestion flow. The following separately provides description.

1. A network device selects a target data packet waiting to enter a queue, and then determines whether a flow corresponding to the target data packet is a congestion flow.

In this embodiment, before entering the queue, the target data packet in the network device needs to be compared with a congestion flow table. If the target data packet matches the congestion flow table, the network device allocates the target data packet to a congestion flow queue. If the target data packet does not match the congestion flow table, when the queue corresponding to the target data packet is congested, the network device determines whether the flow corresponding to the target data packet is the congestion flow.

Figure 5:
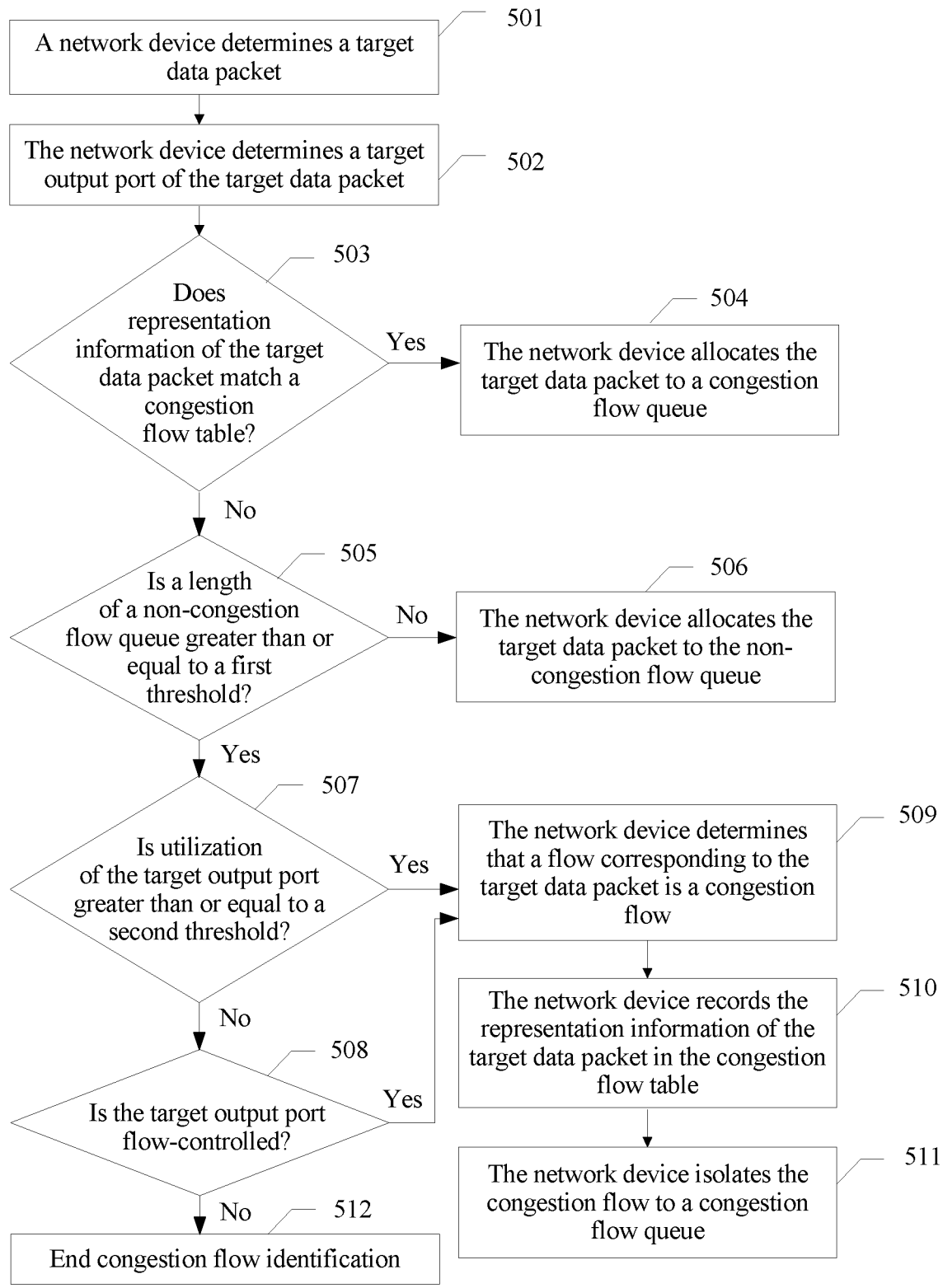
FIG. 5 is a schematic diagram of another embodiment of a congestion flow identification method according to this application.

Referring to FIG. 5, another embodiment of a congestion flow identification method in the embodiments of this application includes the following steps.

501. A network device determines a target data packet.

In this embodiment, the target data packet determined by the network device is a data packet waiting to enter a queue. There may be one or more target data packets. This is not specifically limited herein.

502. The network device determines a target output port of the target data packet.

In this embodiment, after determining the target data packet, the network device may further determine, by searching a FIB, the target output port corresponding to the target data packet.

503. The network device determines whether representation information of the target data packet matches a congestion flow table, and performs step 504 if the representation information of the target data packet matches the congestion flow table, or performs step 505 if the representation information of the target data packet does not match the congestion flow table.

In this embodiment, the network device extracts the representation information of the target data packet waiting to enter the queue. Then, the network device searches the congestion flow table, and determines whether recorded representation information of a congestion flow in the congestion flow table matches the representation information of the target data packet.

It should be noted that the representation information may be a 1-tuple of the target data packet, for example, a destination IP address of the target data packet. Alternatively, the representation information may be a multi-tuple of the target data packet, for example, a 5-tuple of the target data packet, or the representation information may be a 1-tuple or multi-tuple and a mask that are of the target data packet, for example, a destination IP address and a mask that are of the target data packet. This is not specifically limited herein.

It should be noted that each input port in the network device is corresponding to a congestion flow table. In addition, a plurality of different input ports in the network device may share a same congestion flow table. This is not specifically limited herein.

504. The network device allocates the target data packet to a congestion flow queue.

In this embodiment, when the representation information of the target data packet matches the congestion flow table, it indicates that the target data packet belongs to the recorded congestion flow in the network device. Then, the network device allocates the target data packet to the congestion flow queue to which the congestion flow belongs.

505. The network device determines whether a length of a non-congestion flow queue is greater than or equal to a first threshold, and performs step 507 if the length of the non-congestion flow queue is greater than or equal to the first threshold, or performs step 506 if the length of the non-congestion flow queue is less than the first threshold.

In this embodiment, when the representation information of the target data packet does not match the congestion flow table, it indicates that the target data packet does not belong to the recorded congestion flow in the network device.

Further, the network device determines whether the queue length of the non-congestion flow queue corresponding to the target data packet is greater than or equal to the first threshold.

506. The network device allocates the target data packet to the non-congestion flow queue.

In this embodiment, when the queue length of the non-congestion flow queue corresponding to the target data packet is less than the first threshold, it indicates that the non-congestion flow queue is in a normal state. Further, the network device allocates the target data packet to the non-congestion flow queue.

507. The network device determines whether utilization of the target output port is greater than or equal to a second threshold, and performs step 509 if the utilization of the target output port is greater than or equal to the second threshold, or performs step 508 if the utilization of the target output port is less than the second threshold.

In this embodiment, when the queue length of the non-congestion flow queue is greater than or equal to the first threshold, it indicates that congestion occurs in the non-congestion flow queue. Then, the network device determines whether the utilization of the target output port is greater than or equal to the second threshold.

It should be noted that, port utilization=port sending rate/port bandwidth. It may be understood that the port sending rate may be a current sending rate of the port. Alternatively, the port sending rate may be an average sending rate of the port in specific duration. This is not specifically limited herein.

508. The network device determines whether the target output port is flow-controlled, and performs step 509 if the target output port is flow-controlled, or performs step 512 if the target output port is not flow-controlled.

In this embodiment, when the utilization of the target output port is less than the second threshold, the network device further determines whether the target output port is flow-controlled. It may be understood that a flow-controlled output port in the network device cannot normally forward a data packet.

It should be noted that there is no fixed time sequence relationship between step 507 and step 508. Instead of performing step 507 before step 508, step 508 may be performed before step 507. In other words, determining in step 508 is performed, and step 509 is performed if a determining result is yes, or step 507 is performed if a determining result is no. Alternatively, step 507 and step 508 may be performed at the same time, and step 509 may be performed if at least one determining result is yes, or step 512 is performed if both determining results are no. This is not specifically limited herein.

509. The network device determines that a flow corresponding to the target data packet is a congestion flow.

In this embodiment, when the utilization of the target output port is greater than or equal to the second threshold, or when the target output port is flow-controlled, it indicates that the target output port forwards a relatively large quantity of data packets, and a forwarding pause may occur. In this case, the network device determines that the flow corresponding to the target data packet is the congestion flow.

510. The network device records the representation information of the target data packet in the congestion flow table.

In this embodiment, after determining the congestion flow, the network device records the representation information of the target data packet in the congestion flow table. It may be understood that the representation information of the target data packet is representation information of the congestion flow to which the target data packet belongs.

It should be noted that description of the representation information and the congestion flow table is similar to the description in step 503, and details are not described herein again.

511. The network device isolates the congestion flow to a congestion flow queue.

In this embodiment, after determining the congestion flow, the network device isolates the congestion flow to the congestion flow queue. It may be understood that the congestion flow queue may be an existing congestion flow queue in the network device, or may be a newly created congestion flow queue. This is not specifically limited herein.

It should be noted that there is no fixed time sequence relationship between step 510 and step 511. Step 510 may be performed first, or step 511 may be performed first. Alternatively, step 510 and step 511 may be performed at the same time. This is not specifically limited herein.

512. The network device ends congestion flow identification.

In this embodiment, when the target output port is not flow-controlled, it indicates that the target output port can normally forward a data packet, and the corresponding target data packet does not belong to the congestion flow. Then, the network device ends the congestion flow identification performed on the target data packet.

In this embodiment, when the representation information of the target data packet waiting to enter the queue does not match the congestion flow table, the network device determines whether the queue length of the non-congestion flow queue to which the target data packet belongs is greater than or equal to the first threshold. If the queue length of the non-congestion flow queue to which the target data packet belongs is greater than or equal to the first threshold, the network device determines whether the utilization of the target output port corresponding to the target data packet is greater than or equal to the second threshold. If the utilization of the target output port corresponding to the target data packet is greater than or equal to the second threshold, the network device determines that the flow corresponding to the target data packet is the congestion flow. If the utilization of the target output port corresponding to the target data packet is less than the second threshold, the network device further determines whether the target port is flow-controlled. If the target port is flow-controlled, the network device may determine that the flow corresponding to the target data packet is the congestion flow. Congestion flow identification accuracy is improved in the method.

2. A network device selects a target data packet waiting to be output from a queue, and then determines whether a flow corresponding to the target data packet is a congestion flow.

In this embodiment, the network device performs dequeue scheduling according to a preset scheduling policy, so as to determine the target data packet waiting to be output from the queue. Then, when the target data packet belongs to a non-congestion flow queue and congestion occurs in the non-congestion flow queue, the network device determines whether the flow corresponding to the target data packet is the congestion flow.

Figure 6:
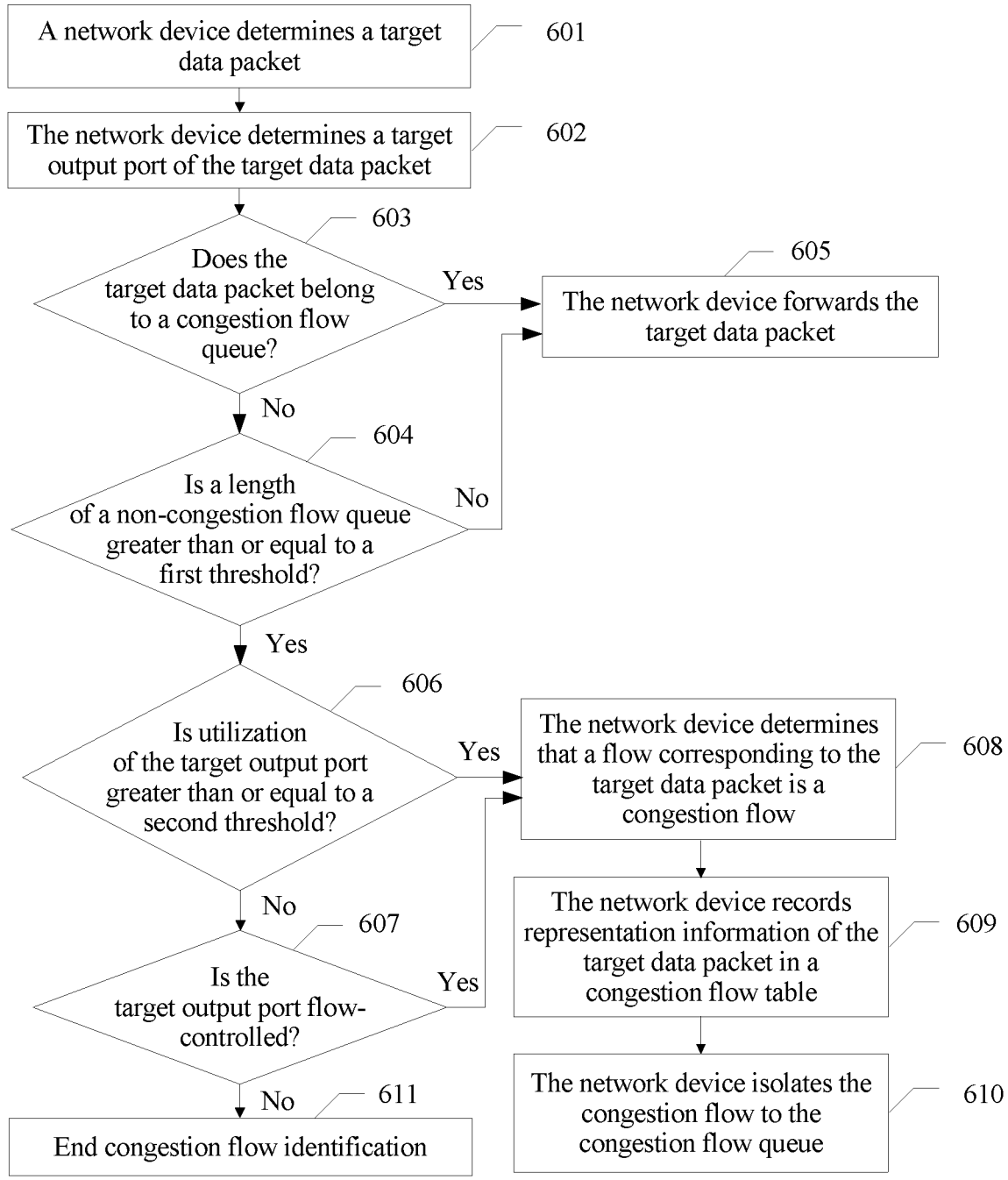
FIG. 6 is a schematic diagram of another embodiment of a congestion flow identification method according to this application.

Referring to FIG. 6, another embodiment of a congestion flow identification method in the embodiments of this application includes the following steps.

601. A network device determines a target data packet.

In this embodiment, the network device performs data packet dequeue scheduling according to a preset scheduling policy. The target data packet determined by the network device is a data packet waiting to be output from a queue. There may be one or more target data packets. This is not specifically limited herein.

602. The network device determines a target output port of the target data packet.

In this embodiment, step 602 is similar to step 502 in the embodiment shown in FIG. 5, and details are not described herein again.

603. The network device determines whether the target data packet belongs to a congestion flow queue, and performs step 604 if the target data packet belongs to the congestion flow queue, or performs step 605 if the target data packet does not belong to the congestion flow queue.

In this embodiment, after determining the target data packet, the network device determines whether the target data packet belongs to the congestion flow queue.

604. The network device determines whether a length of a non-congestion flow queue is greater than or equal to a first threshold, and performs step 606 if the length of the non-congestion flow queue is greater than or equal to the first threshold, or performs step 605 if the length of the non-congestion flow queue is less than the first threshold.

In this embodiment, when the target data packet does not belong to the congestion flow queue, it indicates that the target data packet belongs to the non-congestion flow queue in the network device. Further, the network device determines whether the length of the non-congestion flow queue is greater than or equal to the first threshold.

605. The network device forwards the target data packet.

In this embodiment, when the target data packet belongs to the existing congestion flow queue in the network device or the target data packet belongs to the non-congestion flow queue in a non-congested state, the network device forwards the target data packet.

606. The network device determines whether utilization of the target output port is greater than or equal to a second threshold, and performs step 608 if the utilization of the target output port is greater than or equal to the second threshold, or performs step 607 if the utilization of the target output port is less than the second threshold.

607. The network device determines whether the target output port is flow-controlled, and performs step 608 if the target output port is flow-controlled, or performs step 611 if the target output port is not flow-controlled.

608. The network device determines that a flow corresponding to the target data packet is a congestion flow.

609. The network device records representation information of the target data packet in a congestion flow table.

610. The network device isolates the congestion flow to the congestion flow queue.

611. The network device ends congestion flow identification.

In this embodiment, step 606 to step 611 are similar to step 507 to step 512 in the embodiment shown in FIG. 5, and details are not described herein again.

In this embodiment, when the target data packet waiting to be output from the queue belongs to the non-congestion flow queue, the network device determines whether the queue length of the non-congestion flow queue to which the target data packet belongs is greater than or equal to the first threshold. If the queue length of the non-congestion flow queue to which the target data packet belongs is greater than or equal to the first threshold, the network device determines whether the utilization of the target output port corresponding to the target data packet is greater than or equal to the second threshold. If the utilization of the target output port corresponding to the target data packet is greater than or equal to the second threshold, the network device determines that the flow corresponding to the target data packet is the congestion flow. If the utilization of the target output port corresponding to the target data packet is less than the second threshold, the network device further determines whether the target port is flow-controlled. If the target port is flow-controlled, the network device may determine that the flow corresponding to the target data packet is the congestion flow. Congestion flow identification accuracy is improved in the method.

The congestion flow identification method in the embodiments of this application is described above. The following describes a network device in the embodiments of this application.

Figure 7:
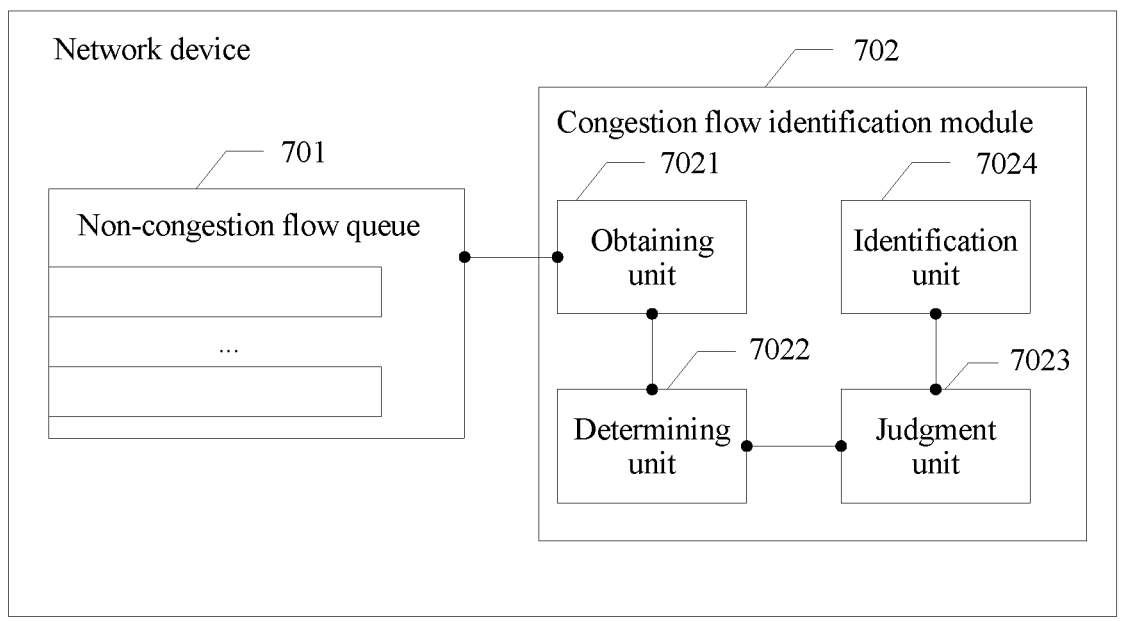
FIG. 7 is a schematic diagram of an embodiment of a network device according to this application.

Referring to FIG. 7, an embodiment of a network device in the embodiments of this application includes a non-congestion flow queue 701 and a congestion flow identification module 702.

The congestion flow identification module 702 further includes:

an obtaining unit 7021, configured to obtain a queue length of a non-congestion flow queue, where the non-congestion flow queue includes a data packet or description information of the data packet;

a determining unit 7022, configured to determine a target output port of a target data packet when the queue length of the non-congestion flow queue is greater than or equal to a first threshold, where the target data packet is a data packet waiting to enter the non-congestion flow queue or a next data packet waiting to be output from the non-congestion flow queue;

a judgment unit 7023, configured to: determine whether utilization of the target output port is greater than or equal to a second threshold; or determine whether the target output port is flow-controlled and is suspended from performing sending; and an identification unit, configured to: when the utilization of the target output port is greater than or equal to the second threshold, or when the target output port is flow-controlled and is suspended from performing sending, determine that a flow corresponding to the target data packet is a congestion flow.

In this embodiment, the obtaining unit 7021 may obtain the queue length of the non-congestion flow queue. When the queue length of the non-congestion flow queue is greater than or equal to the first threshold, the determining unit 7022 determines the target output port corresponding to the target data packet. The judgment unit 7023 may determine whether the utilization of the target output port is greater than or equal to the second threshold, or whether the target output port is flow-controlled and is suspended from performing sending. When the utilization of the target output port is greater than or equal to the second threshold, or when the target output port is flow-controlled and is suspended from performing sending, the identification unit 7024 determines that the flow corresponding to the target data packet is the congestion flow. When the utilization of the target output port is greater than or equal to the second threshold, or when the target output port is flow-controlled and is suspended from performing sending, a flow that needs to be output from the target output port is highly probably a congestion flow. Therefore, congestion flow identification accuracy is improved in the method.

For ease of understanding, the following separately describes in detail the network device in the embodiments of this application from two aspects: identifying a congestion flow when a data packet enters a queue, and identifying a congestion flow when a data packet leaves a queue.

Figure 8:
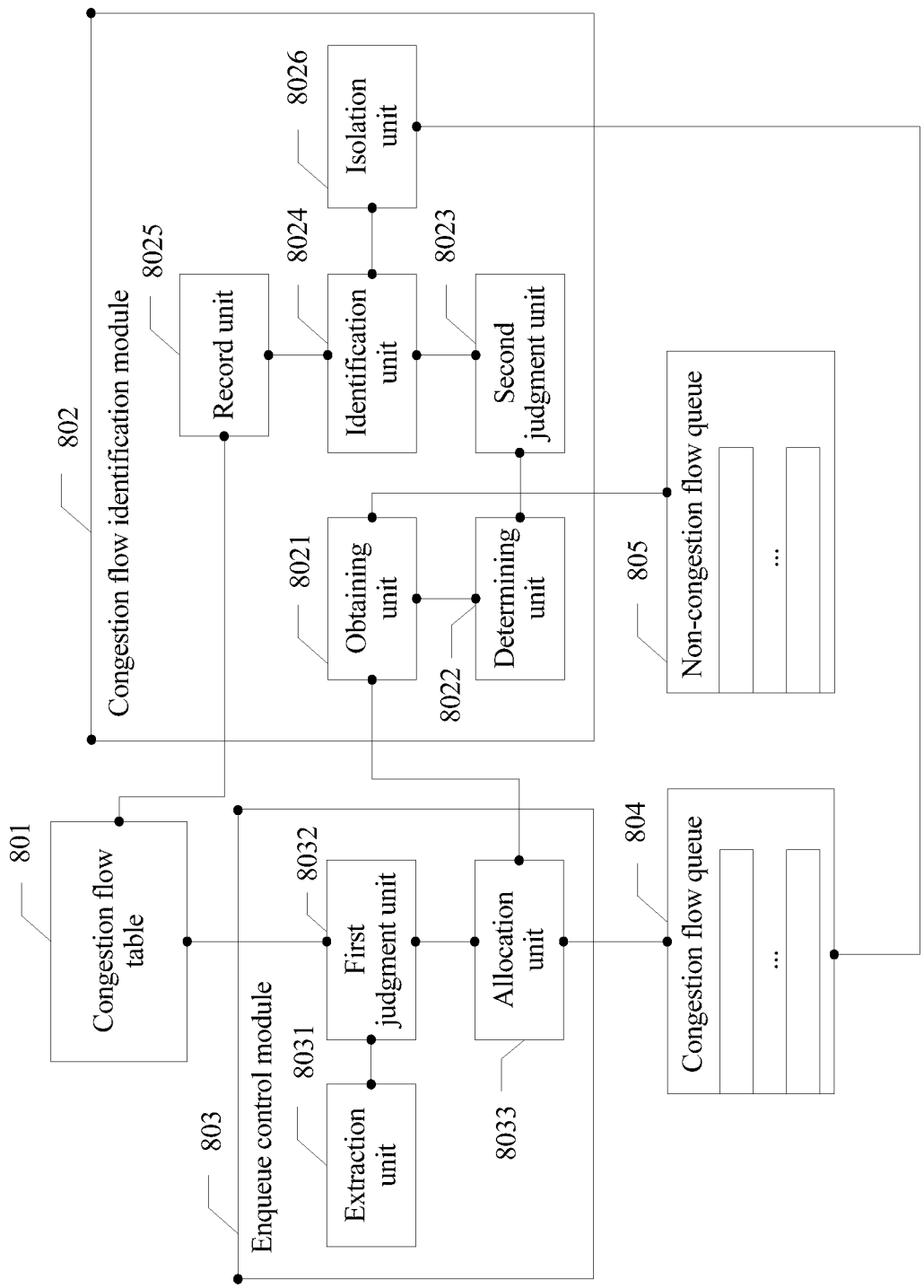
FIG. 8 is a schematic diagram of another embodiment of a network device according to this application.

Referring to FIG. 8, another embodiment of a network device in the embodiments of this application includes:

a congestion flow table 801, a congestion flow identification module 802, an enqueue control module 803, a congestion flow queue 804, and a non-congestion flow queue 805.

The enqueue control module 803 further includes:

an extraction unit 8031, configured to extract representation information of a target data packet;

a first judgment unit 8032, configured to determine whether the representation information of the target data packet matches the congestion flow table 801; and an allocation unit 8033, configured to allocate the target data packet to the congestion flow queue 804 when the representation information of the target data packet matches the congestion flow table 801.

The congestion flow identification module 802 further includes:

an obtaining unit 8021, configured to: when the representation information of the target data packet does not match the congestion flow table 801, obtain a queue length of a non-congestion flow queue corresponding to the target data packet;

a determining unit 8022, configured to determine a target output port of the target data packet;

a second judgment unit 8023, configured to: determine whether utilization of the target output port is greater than or equal to a second threshold; or determine whether the target output port is flow-controlled and is suspended from performing sending;

an identification unit 8024, configured to: when the utilization of the target output port is greater than or equal to the second threshold, or when the target output port is flow-controlled and is suspended from performing sending, determine that a flow corresponding to the target data packet is a congestion flow;

a record unit 8025, configured to record the target representation information of the target data packet in the congestion flow table 801 when the flow corresponding to the target data packet is the congestion flow; and an isolation unit 8026, configured to isolate the congestion flow to the congestion flow queue 804 when the flow corresponding to the target data packet is the congestion flow.

Figure 9:
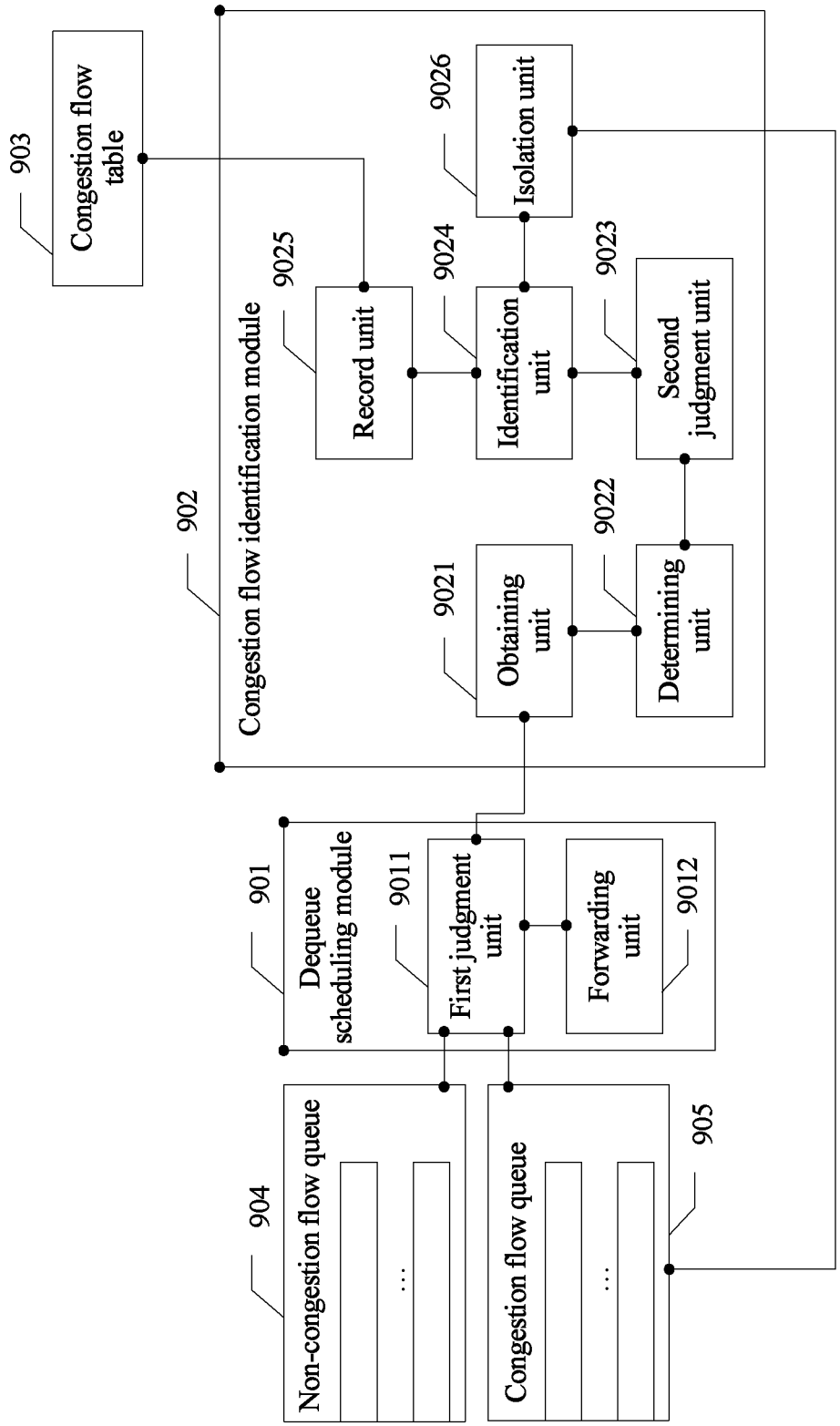
FIG. 9 is a schematic diagram of another embodiment of a network device according to this application.

Referring to FIG. 9, another embodiment of a network device in the embodiments of this application includes:

a dequeue scheduling module 901, a congestion flow identification module 902, a congestion flow table 903, a non-congestion flow queue 904, and a congestion flow queue 905.

The dequeue scheduling module 901 further includes:

a first judgment unit 9011, configured to determine whether a target data packet belongs to the congestion flow queue 905; and a forwarding unit 9012, configured to forward the target data packet when the target data packet belongs to the congestion flow queue 905.

The congestion flow identification module 902 further includes:

an obtaining unit 9021, configured to: when the target data packet does not belong to the congestion flow queue 905, obtain a queue length of a non-congestion flow queue corresponding to the target data packet;

a determining unit 9022, configured to determine a target output port of the target data packet;

a second judgment unit 9023, configured to: determine whether utilization of the target output port is greater than or equal to a second threshold; or determine whether the target output port is flow-controlled and is suspended from performing sending;

an identification unit 9024, configured to: when the utilization of the target output port is greater than or equal to the second threshold, or when the target output port is flow-controlled and is suspended from performing sending, determine that a flow corresponding to the target data packet is a congestion flow;

a record unit 9025, configured to record target representation information of the target data packet in the congestion flow table 903 when the flow corresponding to the target data packet is the congestion flow; and an isolation unit 9026, configured to isolate the congestion flow to the congestion flow queue 905 when the flow corresponding to the target data packet is the congestion flow.

The network device in the embodiments of the present invention is described above from a perspective of a modular functional entity. The following describes the network device in the embodiments of the present invention from a perspective of hardware processing.

Figure 10:
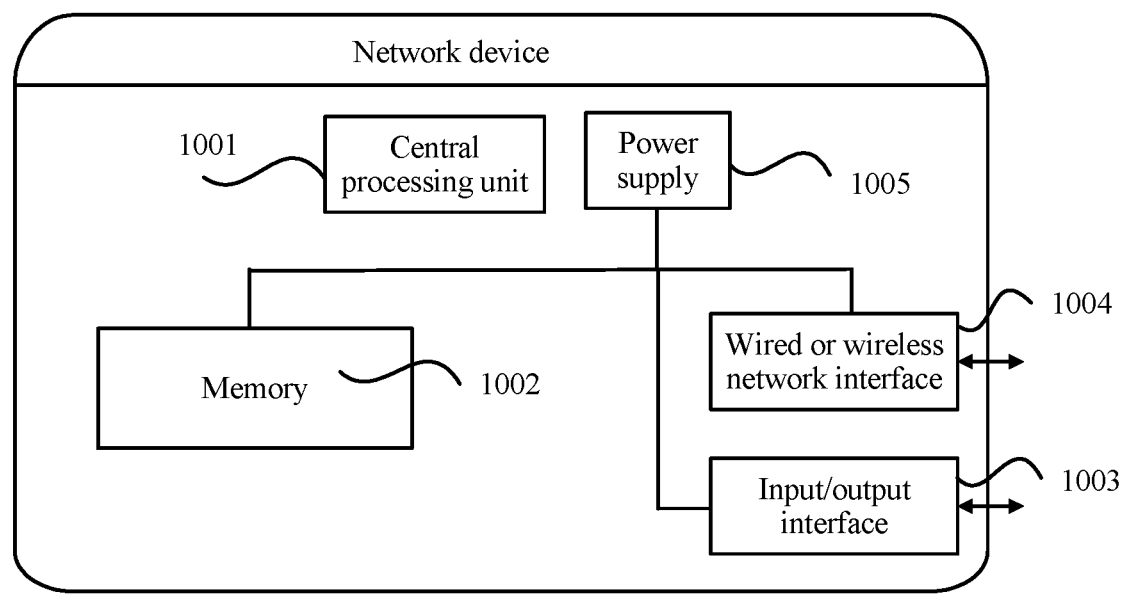
FIG. 10 is a schematic diagram of another embodiment of a network device according to this application.

Referring to FIG. 10, an embodiment of a network device in this application may include one or more central processing units 1001, a memory 1002, an input/output interface 1003, a wired or wireless network interface 1004, and a power supply 1005.

The memory 1002 may be used for temporary storage or permanent storage. Further, the central processing unit 1001 may be configured to: communicate with the memory 1002, and perform, on the network device, a series of instruction operations in the memory 1002.

In this embodiment, the central processing unit 1001 may perform operations performed by the network device in the foregoing embodiments shown in FIG. 3 to FIG. 6, and details are not described herein again.

In this embodiment, specific function module division in the central processing unit 1001 may be similar to a function module division manner of the units such as the congestion flow identification module, the enqueue control module, the dequeue scheduling module, the obtaining unit, the record unit, and the isolation unit described in FIG. 7 to FIG. 9, and details are not described herein again.

In the specification, claims, and accompanying drawings of the embodiments of this application, the terms "first", "second", "third", "fourth", and so on (if any) do not necessarily indicate a specific order or sequence. It should be understood that the data termed in such a way is interchangeable in proper circumstances so that the embodiments described herein can be implemented in other orders than the order illustrated or described herein. Moreover, the term "include" or "contain" and any other variants mean to cover the non-exclusive solution, for example, a process, method, system, product, or device that includes a list of steps or units is not necessarily limited to those expressly listed steps or units, but may include other steps or units not expressly listed or inherent to such a process, method, product, or device.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, read-only memory), a random access memory (RAM, random access memory), a magnetic disk, or an optical disc.

What is claimed is:

1. A congestion flow identification method, comprising:
   obtaining, by a network device, a queue length of a non-congestion flow queue, wherein the non-congestion flow queue comprises a data packet or description information of the data packet;
   determining, by the network device, a target output port of a target data packet when the queue length of the non-congestion flow queue is greater than or equal to a first threshold, wherein the target data packet is a data packet waiting to enter the non-congestion flow queue or a next data packet waiting to be output from the non-congestion flow queue; and
   when utilization of the target output port is greater than or equal to a second threshold, determining, by the network device, that a flow corresponding to the target data packet is a congestion flow.

2. The method according to claim 1, wherein the method further comprises:
   when the utilization of the target output port is less than the second threshold, determining, by the network device, whether the target output port is flow-controlled and suspended from performing sending; and
   if the target output port is flow-controlled and suspended from performing sending, determining, by the network device, that the flow corresponding to the target data packet is the congestion flow.

3. The method according to claim 1, wherein after the determining, by the network device, that a flow corresponding to the target data packet is a congestion flow, the method further comprises:

recording, by the network device, target representation information of the target data packet in a congestion flow table.

4. The method according to claim 3, wherein the method further comprises:

performing, by the network device, enqueue control based on the congestion flow table.

5. The method according to claim 4, wherein the performing, by the network device, enqueue control based on the congestion flow table comprises:

extracting, by the network device, first representation information of a first data packet, wherein the first data packet is a data packet that is after the target data packet and that waits to enter the non-congestion flow queue;

determining, by the network device, whether the first representation information matches the congestion flow table; and allocating, by the network device, the first data packet to a congestion flow queue if the first representation information matches the congestion flow table, wherein the congestion flow queue comprises the congestion flow.

6. The method according to claim 1, wherein after the determining, by the network device, that a flow corresponding to the target data packet is a congestion flow, the method further comprises:

performing, by the network device, dequeue scheduling according to a preset scheduling policy.

7. A congestion flow identification method, comprising:

obtaining, by a network device, a queue length of a non-congestion flow queue, wherein the non-congestion flow queue comprises a data packet or description information of the data packet;

determining, by the network device, a target output port of a target data packet when the queue length of the non-congestion flow queue is greater than or equal to a first threshold, wherein the target data packet is a data packet waiting to enter the non-congestion flow queue or a next data packet waiting to be output from the non-congestion flow queue; and when the target output port is flow-controlled and is suspended from performing sending, determining, by the network device, that a flow corresponding to the target data packet is a congestion flow.

8. The method according to claim 7, wherein the method further comprises:

when the target output port is not flow-controlled and can continue to perform sending, determining, by the network device, whether utilization of the target output port is greater than or equal to a second threshold; and if the utilization of the target output port is greater than or equal to the second threshold, determining, by the network device, that the flow corresponding to the target data packet is the congestion flow.

9. The method according to claim 7, wherein after the determining, by the network device, that a flow corresponding to the target data packet is a congestion flow, the method further comprises:

recording, by the network device, target representation information of the target data packet in a congestion flow table.

10. The method according to claim 9, wherein the method further comprises:

performing, by the network device, enqueue control based on the congestion flow table.

11. The method according to claim 10, wherein the performing, by the network device, enqueue control based on the congestion flow table comprises:

extracting, by the network device, first representation information of a first data packet, wherein the first data packet is a data packet that is after the target data packet and that waits to enter the non-congestion flow queue;

determining, by the network device, whether the first representation information matches the congestion flow table; and allocating, by the network device, the first data packet to a congestion flow queue if the first representation information matches the congestion flow table, wherein the congestion flow queue comprises the congestion flow.

12. The method according to claim 7, wherein after the determining, by the network device, that a flow corresponding to the target data packet is a congestion flow, the method further comprises:

performing, by the network device, dequeue scheduling according to a preset scheduling policy.

13. A network device, comprising:

at least one processor, a memory, a bus, and an input/output interface, wherein the memory stores programming instructions for execution by the at least one processor, and wherein the programming instructions instruct the at least one processor to perform operations comprising:

obtaining a queue length of a non-congestion flow queue, wherein the non-congestion flow queue comprises a data packet or description information of the data packet;

determining a target output port of a target data packet when the queue length of the non-congestion flow queue is greater than or equal to a first threshold, wherein the target data packet is a data packet waiting to enter the non-congestion flow queue or a next data packet waiting to be output from the non-congestion flow queue; and when the target output port is flow-controlled and is suspended from performing sending, determining that a flow corresponding to the target data packet is a congestion flow.

14. The network device according to claim 13, wherein the operations further comprise:

when utilization of the target output port is less than a second threshold, determining, by the network device, whether the target output port is flow-controlled and suspended from performing sending; and if the target output port is flow-controlled and suspended from performing sending, determining that the flow corresponding to the target data packet is the congestion flow.

15. The network device according to claim 13, wherein after the determining, by the network device, that a flow corresponding to the target data packet is a congestion flow, the operations further comprise:

recording target representation information of the target data packet in a congestion flow table.

16. The network device according to claim 15, wherein the operations further comprise:

performing enqueue control based on the congestion flow table.

17. The network device according to claim 16, wherein the performing enqueue control based on the congestion flow table comprises:
- extracting first representation information of a first data packet, wherein the first data packet is a data packet that is after the target data packet and that waits to enter the non-congestion flow queue;
- determining whether the first representation information matches the congestion flow table; and
- allocating the first data packet to a congestion flow queue if the first representation information matches the congestion flow table, wherein the congestion flow queue comprises the congestion flow.

18. The network device according to claim 13, wherein after the determining that a flow corresponding to the target data packet is a congestion flow, the operations further comprise:
- performing dequeue scheduling according to a preset scheduling policy.

* * * * *